Aug. 11, 1936.  C. L. WAGNER  2,050,400
METHOD FOR RECOVERY OF HEAT AND CHEMICALS FROM WASTE PRODUCTS
Filed Feb. 3, 1930
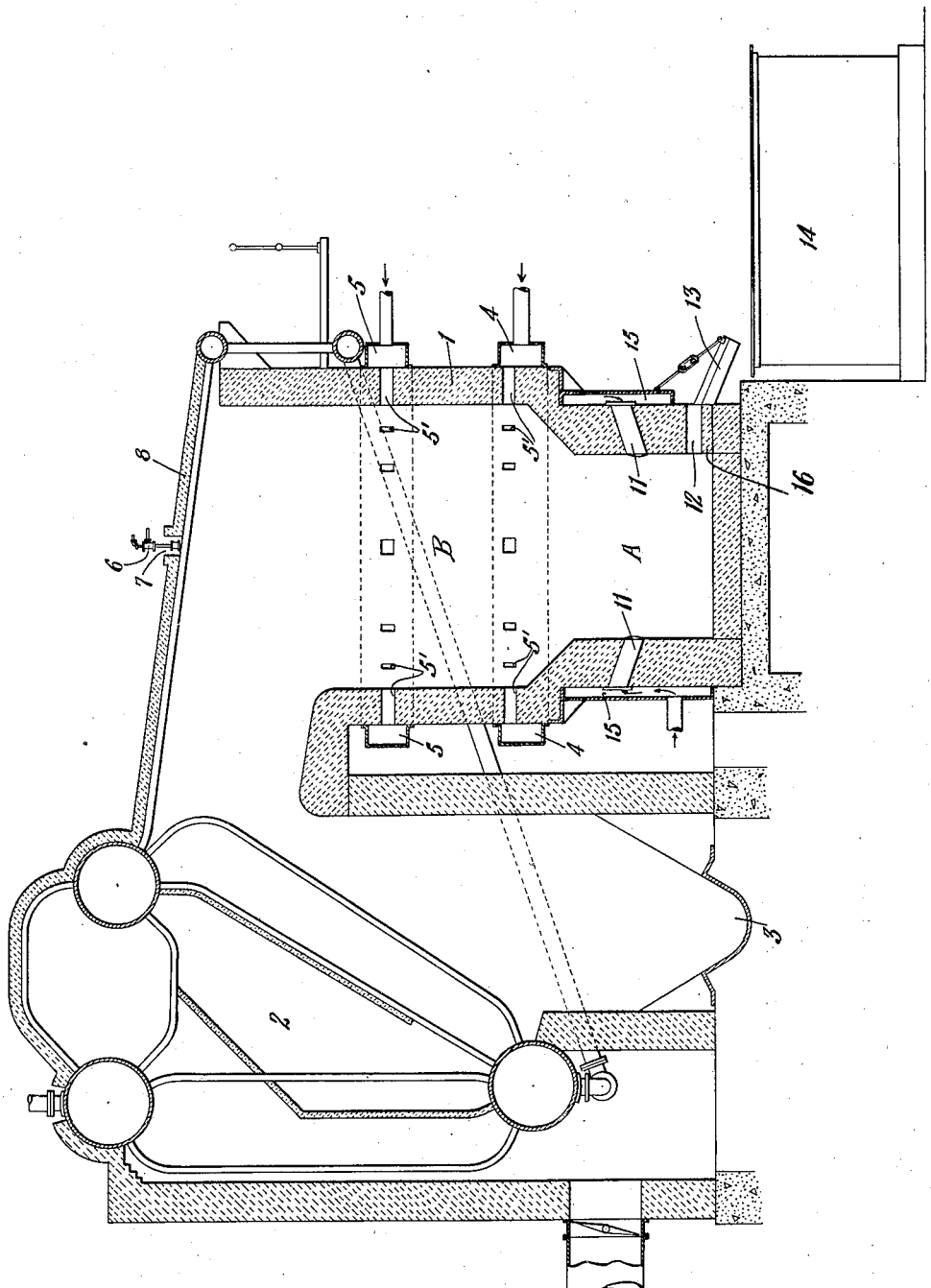
INVENTOR
Charles Linden Wagner
BY C. Campbell Heinicke
ATTORNEY Patented Aug. 11, 1936

2,050,400

UNITED STATES PATENT OFFICE 2,050,400

METHOD FOR RECOVERY OF HEAT AND CHEMICALS FROM WASTE PRODUCTS

Charles Linden Wagner, Boonton, N. J., assignor, by mesne assignments, to The Babcock & Wilcox Company, New York, N. Y., a corporation of New Jersey Application February 3, 1930, Serial No. 425,366

9 Claims. (Cl. 23—48)

This invention relates to a method for the recovery of heat and chemicals from waste products obtained from certain industrial processes such as the alcohol, sugar, and paper pulp industries and applying particularly to molasses, distillery slops from fermentation processes, and black liquor.

In localities where markets cannot be had or reached economically molasses is used for fuel where it is usually mixed with cane refuse or bagasse and burned on grates or on a hearth under boilers. Where the waste products are the result of fermentation for the production of of alcohols (all series) the waste or slops remaining contain all of the different potash organic salts, yeasts, unless previously removed, and organic matters having a high fuel value. In chemical paper pulp processes using soda or sulphur, the waste or "black" liquor from the pulp digesters contains a considerable amount of soda or sulphur together with combustible organic material. These waste products have been frequently an active stream pollution agent and should be destroyed particularly as it is possible to recover heat and chemicals therefrom in the destruction.

The rotary furnace for incineration has been used on all of these products with indifferent success, requiring extra fuel and producing less than 25% of the available heat, as well as the resultant chemical products being very impure with large losses necessitating further treatment of the chemicals in order to permit of their use or to be sold.

An attempt has been made to burn the distillery slops concentrated to varying density in a vertical stationary furnace, the liquors being forcibly sprayed upward from near the base and falling back to the grate partly dried and then partly burned by an air blast under the grate. The results are the production of an impure ash with considerable loss of chemicals and heat and with atmospheric pollution. The volatile combustibles being driven off without the proper and necessary oxygen mixture and not at the proper temperature for combustion result in "dirty" gases which condense on heating surfaces.

One of the objects of this invention is to provide a method for the recovery of heat and chemicals from the waste products derived in the manufacture of alcohol, sugar, paper pulp and allied processes. Other objects of this invention are to provide a self sustaining process for such recovery of chemicals and heat from waste liquors in usable form, to provide a method of continuous operation and to produce the respective primary combustion of carbonized residues to burn the volatile combustibles according to chemical and physical requirements in a unitary structure in zones therein whereby radiant heat is transferable from one zone to another and the ascending gases dry and carbonize the descending liquors, to provide a method whereby the use of additional heating medium for carrying out the combustion of the waste liquors is dispensed with, to provide the method for developing from the volatile constituents of the waste liquor, sufficient heat to carry on the process with a collaterally produced excess of heat for outside heating units such as steam boilers, to provide a method that can be operated by unskilled labor, also to use concentrated liquors without superheating and to regulate temperatures of combustion so as to prevent temperatures detrimental to the structure and prevent actual volatilization of potash salt and to provide a method whereby the quantity, distribution and location of the chemical reactions may be controlled by the control of the admitted air and direction of flow of the gases.

Referring to the drawing:

Figure 1 shows a furnace and boiler in section adapted to carry out the method and process of my invention.

I propose to utilize a vertical furnace 1 communicating with a boiler 2 and dust chamber 3. Furnace 1, I provide with air bustle ducts 4 and 5 admitting air at predetermined positions in the furnace through ports 5.

I propose to spray the material by nozzle 6 through openings 7 in the roof 8 of furnace 1 downwardly against the rising current of gases in vertical furnace 1 causing drying and distillation of organic material in the secondary zone B where air is admitted through ports 5' for the combustion of volatile combustibles, the solid particles falling through the primary zone A where air is admitted through nozzles 11. The particles collect on the hearth in a fluffy mass and are burned by the primary air admitted through nozzles 11. The chemicals fuse and flow out through sluice 12 and spout 13 to a travelling carrier or container 14. Dam 16 is removable and is used when it is desirable to form a smelt pool. The secondary air is led into bustle pipes 4 and 5 surrounding the furnace wall. Openings 5' communicate with the interior bustle pipes 4 and 5 and with zone B of the furnace. The waste gases rise and pass over dust trough 3 and out through boiler 2 of the stack or for other uses. The quantity of air admitted through secondary air ports and primary nozzles is controlled through the control of the blowers which are of any well known type.

In the case of molasses, inversion takes place during fermentation

$$C_{12}H_{22}O_{11}+H_2O=2(C_6H_{12}O_6)=\text{inversion}.$$

The invertase of the yeast causes the inversion to take place and the consequent production of dextrose and levulose.

Molasses contains approximately $C_{12}H_{22}O_{11}$, 35 to 40%, glucose $C_6H_{12}O_6$, 8 to 20%, non-sugars 20 to 36%, water to make 100%.

The non-sugars are composed of organic material, potash and lime salts with various pentoses and albumenoids, which are non-fermentable, sucrose, glucose, and glucosides, partly combined with organic acids, potash and lime salts. A large proportion of these are not readily fermentable by commercial process. When molasses is carbonized, the volatiles given off include hydrogen and complex gases and carbon residue and has a high fuel value while water of combination is also liberated.

Yeast, an organism having a high protein content, and requiring nitrogenous materials to stimulate its growth is added, which splits the hexoses which are fermentable, into alcohol and carbon dioxide (mainly), i. e.

$$C_6H_{12}O_6=2(C_2H_5OH)+2CO_2.$$

The wash left after distilling the alcohol, contains all the non-fermentable sugars, nitrogenous matter and organic impurities, as well as all the salts, and when concentrated has a high fuel value. Acids and yeast foods are also in this residue. When treated according to the above mentioned process the gases given off contain ammonia ($NH_3$) which is collected by acid absorption after the gases leave the boiler, hydrogen and complex gases which burn to water and $CO_2$. The residue, consumed on the hearth, leaves calcium and potash salts, as chlorides, sulphates and carbonates, forming a mixture having eutectic properties, that is, having a very much lower fusion point than any of the original constituents, the fusion point being from 1200 to 1400° F. as compared with 2200 to 3600° F. for the original materials. The fused chemicals are dropped into a water cooled steel trough conveyor, being thereby cooled and forming granules for packing or being dropped into water for solution and separation into purer compounds. Nearly two pounds of fused ash are produced per gallon of concentrated material having 63% solids. The heat balance made on this material shows the following:

Heat balance 734 gallons concentrated slops @ 11.3 lbs. per gallon=8300 lbs. (5230 lbs. solids+3070 water)

Gross heat value 5230 lbs. solids×5525 B. t. u. (per lbs. of solid) =28,900,000 B. t. u.

8300 lbs. liquor×160 (degrees)—60 (degrees) ×.80 (sp. ht.) =664,000 B. t. u. (sensible heat)

Gross heat value 28,900,000+664,000=29,564,000

Losses:
Total solids—ash=organic
4150 lbs. (organic) ×15 lbs. (air) =62,300 lbs.
62,300 lbs.×500°—60°×.24 (sp. heat) =6,575,000 B. t. u.

3070 lbs. (water) ×1250 B. t. u. (latent heat and super heat) =3,840,000

Heating 1010 lbs. ash×(1800°—60°) ×.24 (sp. heat) =463,000 B. t. u.

Heat of fusion 1200 lbs. ash×52 B. t. u.=_____ 65,000 B. t. u.
Water of combination 20% superheating only 220 lbs.×150 B. t. u._____ 33,000 B. t. u. of total amount of ingoing material which turns to water
Radiation 5% of total_____ 1,445,000 B. t. u.
Furnace and boiler setting_ 12,421,000 B. t. u.

Gross _____ 29,564,000 B. t. u.
Loss _____ 12,421,000 B. t. u.

Net _____ 17,143,000 B. t. u.

17,143,000=17,680 lbs. (steam) =58% efficiency 970 (latent heat of 1 lb. of steam)

Then ash approx. 1310 lbs.×90%=1175 from the spout.

135 lbs. (ash) in boiler and dust collector

Under present practice less than 25% of actual steam is produced while by this process there is an efficiency of 58%.

If the yeasts are separated by sedimentation before distilling they may be used for other purposes and the operation is simplified.

The method of recovering heat and chemicals herein, consists primarily in spraying the concentrated waste liquors downwardly into a vertical furnace against a rising current of gases to simultaneously dry off the moisture content of the waste liquors, then to carbonize or destructively distill the organic materials contained in the liquor, releasing volatile combustibles which are burned in the upper zone B of the furnace by means of air controlled ducts 4 and 5 and ports 5' to and admitted in that zone, the carbonized residue being separated by gravity and falling to the lower zone A where a controlled predetermined quantity of air is admitted to burn the carbonized residue and fuse the chemicals. The air is controlled as to quantity admitted to the second zone to give CO and $CO_2$ in the proper and desired proportions to secure the necessary temperature and to control the gas velocities whereby such velocities do not exceed the rate which would carry out the descending materials and to collect and withdraw the fused chemicals from the hearth of the furnace and to collect and withdraw the gases from the upper zone. By this process no other fuel is used than the concentrated waste liquors after the initial preheating of the furnace. The air admission is controlled to maintain either a reducing zone and oxidizing zone, or both oxidizing or both reducing as required by the particular material used, to prevent oxidation of chemicals to undesirable compounds. Dust losses are practically eliminated which is not the case in rotary and other processes. Ethers, aldehydes, ethylene products, slimes and acids produced either through impurities or faulty manipulation during fermentation, have no effect on the operation of this process. The process is applicable to the recovery of heat and chemicals from waste products in other industries besides the alcohol sugar and paper pulp industries. This application is a continuation in part of certain subject matter disclosed in my prior application, Serial No. 4,359, filed Jan. 24, 1925, which issued on July 29, 1930, as Patent No. 1,771,829.

What I claim is:

1. A self-sustaining process of recovering chemicals and heat in a vertical recovery furnace from concentrated liquor comprising water with organic and inorganic substances which comprises spraying the liquor downwardly through the upper section of the furnace in contact with an ascending stream of high temperature gases causing the sprayed liquor to be dehydrated and volatile organic combustibles to be distilled in the upper section of the furnace, supplying secondary air to the upper section of the furnace for the combustion at high temperatures therein of the combustible volatiles distilled, collecting the solid residue in the lower section of the furnace, supplying primary air to the lower section of the furnace for the combustion of the combustible portion of the solid residue therein without the addition of other combustible matter, utilizing a portion of the heat generated in the lower section for the liquefaction therein of the included non-combustible solids, utilizing the products of combustion from the lower section for the dehydrating and distilling of liquor subsequently introduced into the upper section of the furnace, and withdrawing the included non-combustible solids from the lower section in liquid form.

2. A self-sustaining process of recovering chemicals and heat in a vertical recovery furnace from concentrated liquor comprising water with organic and inorganic substances which comprises spraying the liquor downwardly through the upper section of the furnace in contact with an ascending stream of high temperature gases causing the sprayed liquor to be dehydrated and volatile organic combustibles to be distilled in the upper section of the furnace, supplying secondary air to the upper section of the furnace for the combustion at high temperatures therein of the combustible volatiles distilled, collecting the solid residue in the lower section of the furnace, supplying primary air to the lower section of the furnace for the combustion of the combustible portion of the solid residue therein without the addition of other combustible matter, utilizing a portion of the heat generated in the lower section for the liquefaction therein of the included non-combustible solids, utilizing the products of combustion from the lower section for the dehydrating and distilling of liquor subsequently introduced into the upper section of the furnace, withdrawing the included non-combustible solids from the lower section in liquid form, and causing the gases leaving the upper section of the furnace to flow in heat transfer relationship with another and colder fluid.

3. A continuous self-sustaining process of treating waste liquor containing combustible organic matter which comprises spraying the liquor into the upper section of a preheated furnace into intimate contact with an ascending stream of high temperature heating gases, the liquor spray being so directed as to cause the liquor to remain in the upper furnace section in heat absorbing relation with the heating gases for an interval sufficient to effect substantially complete dehydration of and at least partial distillation of volatile combustibles in the liquor while in the upper section, supplying primary combustion air to the lower section of the furnace for the burning of the dehydrated residue depositing therein from the upper section without requiring the addition of auxiliary fuel, directing the heating gases generated in the lower section upwardly through the upper section for dehydrating the liquor being sprayed thereinto, supplying secondary combustion air directly to the upper section for the burning therein of the combustible gases distilled from the liquor while in the upper section and any unconsumed combustibles escaping from the lower section, and withdrawing the heating gases from the upper part of the upper section.

4. A self-sustaining process of recovering chemicals and heat in a vertical recovery furnace from liquor containing chemicals and combustible organic matter which comprises introducing the liquor in spray form into the upper section of the furnace, causing the liquor introduced to pass in heat absorbing relation with an ascending stream of high temperature gases to an extent sufficient to effect substantially complete dehydration of and at least partial distillation of volatile combustibles in the liquor while in the upper section of the furnace and the delivery of the dehydrated solid residue to the lower section of the furnace in condition for rapid combustion of its combustible portion without the addition of auxiliary heat to the furnace, supplying primary combustion air to the lower section of the furnace for the combustion of the combustible portion of the solid residue, utilizing a portion of the heat generated in the lower section for the liquefaction therein of the included chemicals, utilizing the products of combustion from the lower section for dehydrating additional liquor introduced into the upper section of the furnace, supplying secondary combustion air to the upper section of the furnace for the combustion of the combustible gases distilled from the liquor while in the upper section and any unconsumed combustibles escaping from the lower section, withdrawing the heating gases at the upper end of the upper section, and withdrawing the liquefied chemicals from the lower section.

5. A self-sustaining process of recovering chemicals and heat in a vertical recovery furnace from liquor containing chemicals and combustible organic matter which comprises introducing the liquor in spray form into the upper section of the furnace at a temperature not exceeding its boiling point at the furnace pressure, causing the liquor introduced to pass in heat absorbing relation with an ascending stream of high temperature gases to an extent sufficient to effect substantially complete dehydration of and at least partial distillation of volatile combustibles in the liquor while in the upper section of the furnace and the delivery of the dehydrated solid residue to the lower section of the furnace in condition for rapid combustion therein of its combustible portion without the addition of auxiliary heat to the furnace, supplying primary combustion air to the lower section of the furnace for the combustion of the combustible portion of the solid residue, utilizing a portion of the heat generated in the lower section for the liquefaction therein of the included chemicals, utilizing the products of combustion from the lower section for dehydrating additional liquor introduced into the upper section of the furnace, supplying secondary combustion air to the upper section of the furnace for the combustion of the combustible gases distilled from the liquor while in the upper section and any unconsumed combustibles escaping from the lower section regulating the admission of primary and secondary air to the furnace to control the character of the atmosphere in the lower and upper sections of the furnace, and withdrawing the liquefied chemicals from the lower section.

6. A self-sustaining process of recovering chemicals and heat in a vertical recovery furnace from concentrated liquor containing chemicals and combustible organic matter which comprises spraying the liquor downwardly through the upper section of the furnace in heat absorbing relation with an ascending stream of high temperature gases to an extent sufficient to cause the sprayed liquor to be substantially completely dehydrated and volatile organic combustibles to be distilled therefrom during its downward passage and the dehydrated solid residue to be delivered to the lower section of the furnace in condition for rapid combustion therein of its combustible portion without the addition of auxiliary heat to the furnace, supplying secondary air to the upper section of the furnace for the combustion of combustible gases present therein, collecting the solid residue in the lower section of the furnace, supplying primary air to the lower section of the furnace for the combustion of the combustible portion of the solid residue therein, utilizing a portion of the heat generated in the lower section for the liquefaction therein of the included chemicals, utilizing the products of combustion from the lower section for the dehydrating and distilling of additional liquor introduced into the upper section of the furnace, withdrawing the liquefied chemicals from the lower section, regulating the admission of primary and secondary air to control the character of the atmosphere in the lower and upper sections of the furnace, and causing the gases leaving the upper section of the furnace to flow in heat transfer relationship with another and colder fluid.

7. A continuous self-sustaining process of treating paper pulp residual liquor containing chemicals and combustible organic matter which comprises discharging a stream of the liquor into the upper section of a preheated furnace and into contact with an ascending stream of high temperature heating gases, the liquor stream being so directed as to cause the liquor to remain in the upper furnace section in heat absorbing relation with the heating gases for an interval sufficient to effect substantially complete dehydration of and at least partial distillation of volatile combustibles in the liquor while in the upper section, supplying primary combustion air to the lower section of the furnace for the burning of the dehydrated residue depositing therein from the upper section and smelting of the included chemicals without requiring the addition of auxiliary fuel, directing the heating gases generated in the lower section upwardly through the upper section for dehydrating the liquor being discharged thereinto, supplying secondary combustion air directly to the upper section for the burning therein of the combustible gases distilled from the liquor while in the upper section and any unconsumed combustibles escaping from the lower section, withdrawing the molten chemicals from the lower section, and withdrawing the heating gases from the upper part of the upper section.

8. A continuous self-sustaining process of treating paper pulp residual liquor containing organic matter which comprises spraying the liquor into the upper section of a preheated furnace of the vertical shaft type into intimate contact with an ascending stream of high temperature heating gases, the liquor spray being so directed as to cause the liquor to remain in the upper furnace section in heat absorbing relation with the heating gases for an interval sufficient to effect substantially complete dehydration of and at least partial distillation of volatile combustibles in the liquor while in the upper section, supplying primary combustion air to the lower section of the furnace for the burning of the dehydrated residue depositing therein from the upper section without requiring the addition of auxiliary fuel, directing the heating gases generated in the lower section upwardly through the upper section for dehydrating the liquor being sprayed thereinto, supplying secondary combustion air directly to the upper section for the burning therein of the combustible gases distilled from the liquor while in the upper section and any unconsumed combustibles escaping from the lower section, and withdrawing the heating gases from the upper part of the upper section.

9. A continuous self-sustaining process of treating paper pulp residual liquor containing chemicals and combustible organic matter which comprises spraying the liquor into the upper section of a preheated furnace of the vertical shaft type into intimate contact with an ascending stream of high temperature heating gases, the liquor spray being so directed as to cause the liquor to remain in the upper furnace section in heat absorbing relation with the heating gases for an interval sufficient to effect substantially complete dehydration of and at least partial distillation of volatile combustibles in the liquor while in the upper section, supplying primary combustion air to the lower section of the furnace for the burning of the dehydrated residue depositing therein from the upper section and smelting of the included chemicals without requiring the addition of auxiliary fuel, directing the heating gases generated in the lower section upwardly through the upper section for dehydrating the liquor being sprayed thereinto, supplying secondary combustion air directly to the upper section for the burning therein of the combustible gases distilled from the liquor while in the upper section and any unconsumed combustibles escaping from the lower section, withdrawing the molten chemicals from the lower section, and withdrawing the heating gases from the upper part of the upper section.

CHARLES LINDEN WAGNER.